United States Patent
Nguyen (10) Patent No.: US 7,235,217 B2
(45) Date of Patent: Jun. 26, 2007

(54) METHOD AND APPARATUS FOR RAPID HEATING OF FUEL REFORMING REACTANTS

(75) Inventor: Kevin Hoa Nguyen, Missouri City, TX (US)

(73) Assignee: Texaco Inc., San Ramon, CA (US)

( * ) Notice: Subject to any disclaimer, the term of this patent is extended or adjusted under 35 U.S.C. 154(b) by 0 days.

(21) Appl. No.: 10/408,080

(22) Filed: Apr. 4, 2003

(65) Prior Publication Data

US 2004/0194384 A1  Oct. 7, 2004

(51) Int. Cl.
*B01J 19/00* (2006.01)

(52) U.S. Cl. .................. 422/198; 48/94; 429/17; 429/19; 429/20; 429/26; 431/8; 60/303; 165/173

(58) Field of Classification Search .............. 429/19; 48/90, 197 R; 431/7–11; 422/192–94; 60/39
See application file for complete search history.

(56) References Cited

U.S. PATENT DOCUMENTS

| | | | |
|---|---|---|---|
| 4,236,899 A | 12/1980 | Gulden et al. | |
| 4,522,894 A | 6/1985 | Hwang et al. | |
| 4,844,837 A | 7/1989 | Heck et al. | |
| 4,909,808 A * | 3/1990 | Voecks | 48/94 |
| 4,926,933 A * | 5/1990 | Gray | 165/173 |
| 5,547,368 A * | 8/1996 | Slavejkov et al. | 431/8 |
| 5,584,178 A * | 12/1996 | Naegeli et al. | 60/303 |
| 6,077,620 A | 6/2000 | Pettit | |
| 6,190,623 B1 | 2/2001 | Sanger et al. | |
| 6,232,005 B1 * | 5/2001 | Pettit | 429/19 |
| 6,254,807 B1 | 7/2001 | Schmidt et al. | |
| 6,257,868 B1 * | 7/2001 | Durst et al. | 431/7 |
| 6,348,278 B1 | 2/2002 | LaPierre et al. | |
| 6,458,334 B1 | 10/2002 | Tamhankar et al. | |
| 6,465,118 B1 | 10/2002 | Dickman et al. | |
| 6,497,856 B1 | 12/2002 | Lomax et al. | |
| 6,521,204 B1 | 2/2003 | Borup et al. | |
| 2002/0071790 A1 | 6/2002 | Woods et al. | |

(Continued)

FOREIGN PATENT DOCUMENTS

EP    1193217 A1    3/2002

(Continued)

*Primary Examiner*—Glenn A. Caldarola
*Assistant Examiner*—Vinit H. Patel
(74) *Attorney, Agent, or Firm*—Frank C. Turner; Melissa Patangia (57) ABSTRACT

Apparatus and method for rapidly heating one or more reactants for use in a fuel reformer. The apparatus includes a combustion section having an outer wall enclosing a combustion chamber and a catalyst disposed within the combustion chamber. A heat recovery section is in fluid communication with the combustion section and has an outer wall defining a heat recovery chamber. At least one heat exchanging element is located within the heat recovery chamber having an inlet for receiving a fuel reforming reactant and an outlet for directing a heated reactant out of the heat recovery section. The combustion section is elevated relative to the heat recovery section such that heated combustion gases are displaced down into the heat recovery section. The housing has an internal diameter of less than about 10 inches, or alternatively, has a length and a diameter in a ratio of between about 7:1 and about 4:1.

25 Claims, 2 Drawing Sheets

U.S. PATENT DOCUMENTS

| | | |
|---|---|---|
| 2002/0083646 A1 | 7/2002 | Deshpande et al. |
| 2002/0088740 A1 | 7/2002 | Krause et al. |
| 2002/0090326 A1 | 7/2002 | Deshpande |
| 2002/0090327 A1 | 7/2002 | Deshpande |
| 2002/0090328 A1 | 7/2002 | Deshpande |
| 2002/0094310 A1 | 7/2002 | Krause et al. |
| 2002/0155329 A1 | 10/2002 | Stevens |
| 2002/0170504 A1 | 11/2002 | Kasahara et al. |
| 2003/0021741 A1 | 1/2003 | Childress et al. |
| 2003/0021742 A1 | 1/2003 | Krause et al. |

FOREIGN PATENT DOCUMENTS

| | | |
|---|---|---|
| WO | WO 200066487 | 11/2000 |

* cited by examiner

METHOD AND APPARATUS FOR RAPID HEATING OF FUEL REFORMING REACTANTS

BACKGROUND OF THE INVENTION

Fuel cells provide electricity from chemical oxidation-reduction reactions and possess significant advantages over other forms of power generation in terms of cleanliness and efficiency. Typically, fuel cells employ hydrogen as the fuel and oxygen as the oxidizing agent. The power generation is generally proportional to the consumption rate of the reactants.

A significant disadvantage which inhibits the wider use of fuel cells is the lack of a widespread hydrogen infrastructure. Hydrogen has a relatively low volumetric efficiency and is more difficult to store and transport than hydrocarbon fuels currently used in most power generation systems. One way to overcome this difficulty is the use of reformers to convert hydrocarbons to a hydrogen-rich gas stream that can be stored or used locally as a feed for fuel cells.

Hydrocarbon-based fuels, such as natural gas, LPG, gasoline, and diesel, require conversion processes to be used as fuel sources for most fuel cells. Current art uses multi-step processes combining an initial conversion process with several clean-up processes. The initial process is most often steam reforming (SR), autothermal reforming (ATR), catalytic partial oxidation (CPOX), non-catalytic partial oxidation (POX) or a combination thereof. The clean-up processes usually comprise a combination of desulphurization, high temperature water-gas shift, low temperature water-gas shift, selective CO oxidation, or selective CO methanation. Alternative processes include hydrogen selective membrane reactors and filters.

Despite the above work, there remains a need for a simplified fuel processing system for converting a hydrocarbon fuel to a hydrogen rich gas stream for use with a fuel cell. A practical obstacle facing any solution to this problem is the need to rapidly start-up the reforming reactor and the various catalyst beds that may be used in the reforming process. Where autothermal reforming is desired, there is also the need to rapidly pre-heat the reforming reactants to their autothermal temperature(s) and to maintain those temperatures throughout the reforming process. Similarly, where steam reforming is used, the rapid and reliable generation of steam is also required.

The present invention addresses the need for a fuel reformer that is capable of rapid start-up and maintaining a more stable temperature profile during the operation of the reformer.

SUMMARY OF THE INVENTION

The present invention provides an apparatus for rapidly heating one or more reactants for use in a fuel reformer. The apparatus comprises a combustion section having an outer wall enclosing a combustion chamber and one or more a catalysts disposed within the combustion chamber. The one or more catalysts provide a non-diffused flow path through the combustion chamber for the combusting gases and heat generation. A heat recovery section is in fluid communication with the combustion section and has an outer wall defining a heat recovery chamber and at least one heat exchanging element is disposed therein. The combustion section is elevated relative to the heat recovery section such that heated combustion gases are driven down into the heat recovery section. The heat exchanging elements each have an inlet for receiving a fuel reforming reactant and an outlet for directing a heated reactant out of the heat recovery section. Optionally, at least one of the heat exchanging elements is used to exchange heat between the heated combustion gases and water so as to generate steam for use in a reformer. The combustion and heat recovery sections have outer walls that are continuous with one another to form a housing, preferably in the shape of a cylinder. The housing has an internal diameter of less than about 10 inches, preferably less than about 8 inches, and more preferably less than about 6 inches.

In a process aspect, the present invention provides a method for rapidly heating a fuel reforming reactant for use in a fuel reformer. The method comprises the steps of combusting in a pre-reformer a fuel and an oxygen-containing gas over one or more combustion catalysts to generate heated combustion gases within a combustion section, providing a non-diffused flow path for the heated combustion gases through the combustion section and into a heat recovery section, exchanging heat between the heated combustion gases and a fuel reformer reactant in the heat recovery section to generate a heated reactant and directing the heated reactant to a bottom-fed reformer. The combustion section is elevated relative to the heat recovery section such that heated combustion gases are driven down into the heat recovery section. The heated combustion gases are rapidly heated to an operational temperature of at least about 550° C., a temperature at which there is sufficient heat exchange between the reformer reactant and steam generation. Preferably, the heated combustion gases reach an operational temperature in less than about 20 minutes, more preferably less than about 15 minutes, and still more preferably less than about 10 minutes.

The present invention further provides an integrated fuel reforming apparatus for rapid start-up and minimal heat loss. The integrated apparatus comprises a pre-reformer configured to provide a heated reformer reactant to a fuel reformer, said pre-reformer comprising a combustion section having an outer wall enclosing a combustion chamber and a catalyst disposed within the combustion chamber. The catalyst provides a non-diffused flow path for combustion gases and heat through the combustion chamber. A heat recovery section is in fluid communication with the combustion section that has an outer wall defining a heat recovery chamber and at least one heat exchanging element disposed within the heat recovery chamber. The heat exchanging element has an inlet for receiving a reformer reactant and an outlet for directing a heated reactant out of the heat recovery chamber. Particularly, the combustion section is elevated relative to the heat recovery section. A fuel reformer is connected to the outlet of the heat exchanging element for receiving a heated reactant from the pre-reformer. Preferably, the reformer is a bottom-fed steam reformer. Optionally, at least one of the heat exchanging elements is used to exchange heat between the heated combustion gases and water so as to generate steam for use in a reformer. The combustion and heat recovery sections of the pre-reformer have outer walls that are continuous with one another to form a housing. The housing has a length and a diameter in a ratio of between about 7:1 and about 4:1.

The present invention further provides an integrated fuel reforming apparatus for rapid start-up. The apparatus comprises a pre-reformer configured to provide a heated reforming reactant to a fuel reformer, said pre-reformer comprising a housing, a combustion chamber having a combustion catalyst disposed therein for generating heated combustion gases, and a heat recovery section having at least one heat exchanging element disposed therein. The heat exchanging element has an inlet for receiving a reactant and an outlet for directing a heated reactant out of the heat recovery section. The housing has a length and diameter in a ratio of between about 7:1 to about 4:1. A fuel reformer can be connected to the outlet of the heat exchanging element for receiving a heated reactant from the pre-reformer.

BRIEF DESCRIPTION OF THE DRAWINGS

The invention may be understood by reference to the following description taken in conjunction with the accompanying drawings.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENTS

Illustrative embodiments of the invention are described below. In the interest of clarity, not all features of an actual embodiment are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover it will be appreciated that such a development effort might be complex and time-consuming, but would nevertheless be a routine undertaking for those of ordinary skill in the art having the benefit of this disclosure.

Figure 1:
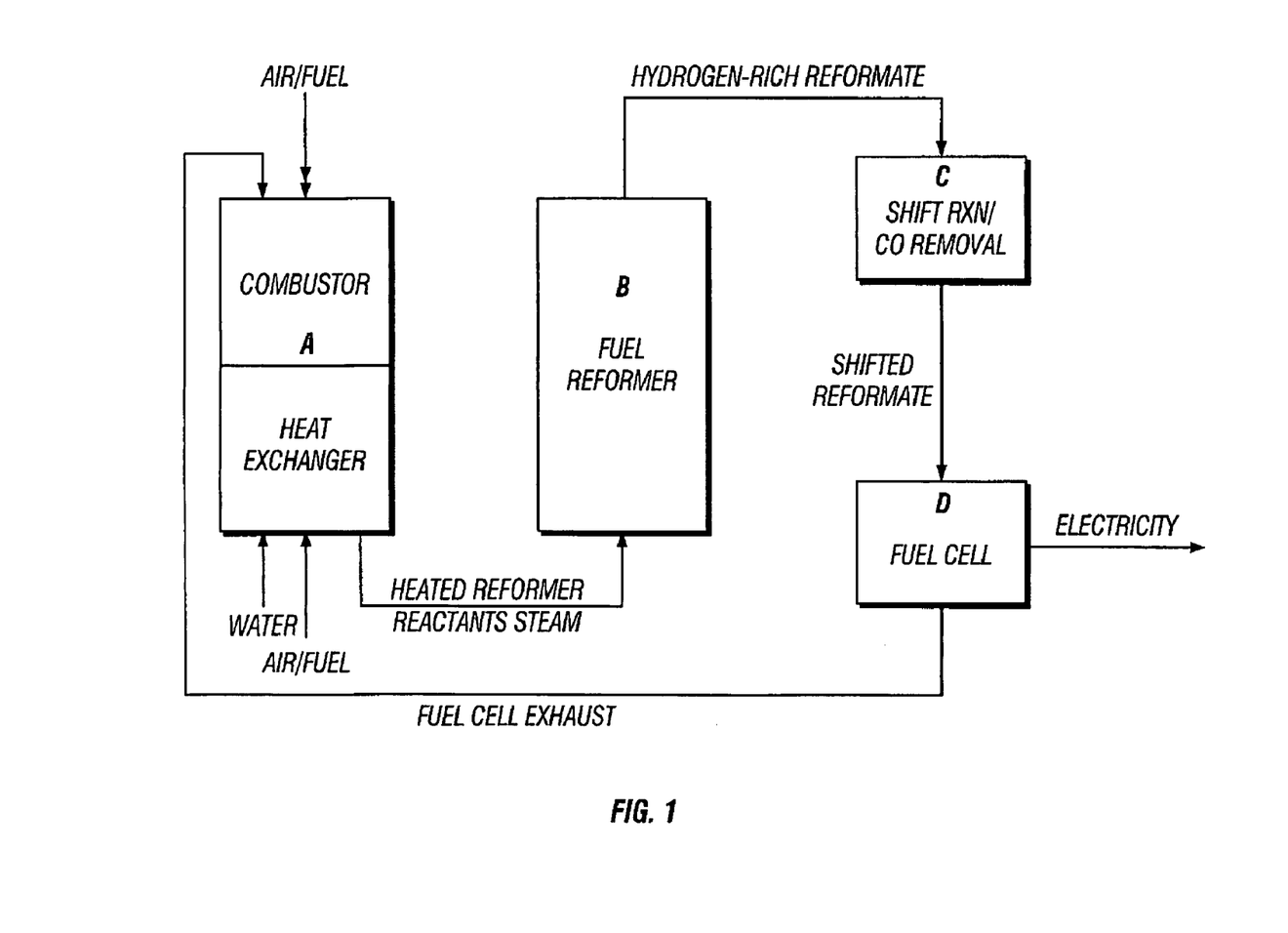
FIG. 1 is a simple block diagram illustrating the present invention and the integration of a pre-reformer, reformer and fuel cell stack.

FIG. 1 is a block diagram of a pre-reformer A integrated with a fuel reformer B for use in providing a hydrogen-rich reformate as fuel to a fuel cell stack D. FIG. 1 is highly simplified and is intended to illustrate the manner in which these systems may be integrated into an integrated fuel processor and power generating system. Module C is a clean-up stage module(s) wherein hydrogen rich reformate may be desulfurized, subjected to a shift reaction to increase the hydrogen concentration, and/or subjected to a process or reaction for removing carbon monoxide from the reformate stream. Fuel cell exhaust gas, anode and/or cathode, can be routed to the combustor section of the apparatus of the present invention for disposal.

Sources of a combustion fuel and an oxygen-containing gas are directed to the combustor section of the pre-reformer to fuel the combustion reaction. Heated combustion gases that are generated within the combustor are passed down into the heat exchanger section. Sources of water, fuel and an oxygen-containing gas are routed to the heat exchanger section for conversion to steam and heating respectively before being directed to the Fuel Reformer B. Not shown is an exhaust line for venting the combustion product gases from the heat exchange section.

The pre-reformer and reformer described below can be fabricated from any material capable of withstanding the operating conditions and chemical environment of the reactions described herein and can include, for example, stainless steel, Inconel, Incoloy, Hastelloy, and the like. The reaction pressure is preferable from about 0 to about 100 psig, although higher pressures may be employed. The operating pressure of the reactor depends upon the delivery pressure required by the fuel cell. For fuel cells operating in the 1 to 20 kW range an operating pressure of 0 to about 100 psig is generally sufficient.

Pre-reformer

Figure 2:
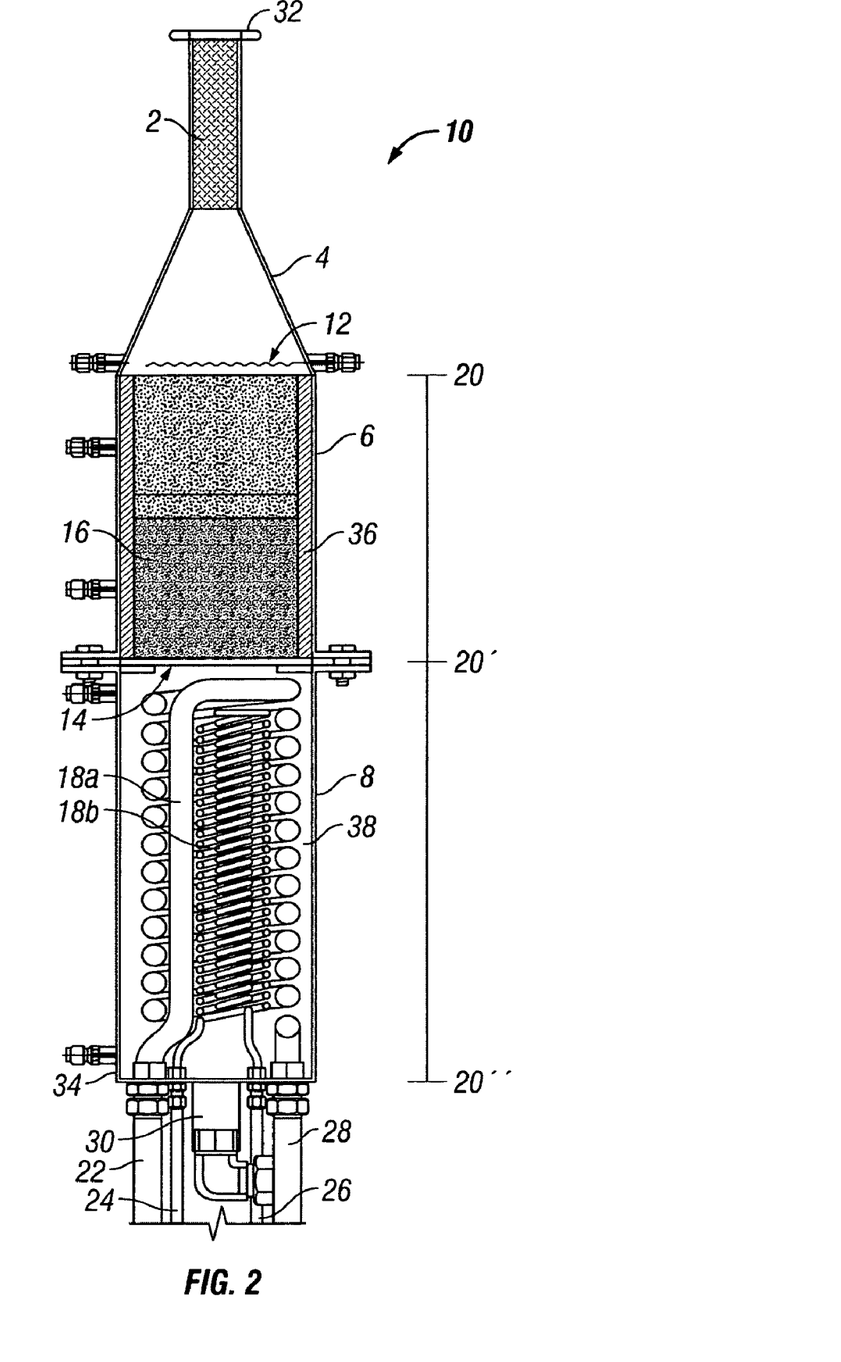
FIG. 2 is cross sectional view of a pre-reformer of the present invention.

FIG. 2 is a cross sectional view of a pre-reformer of the present invention. Pre-reformer 10 has a number of functions including the generation of heat to pre-heat reformer reactants, the generation of steam for use in the reforming reaction, and the disposal through oxidation of various fuel cell exhaust gases and reformate that is not of fuel cell quality. The pre-heating of reformer reactants is particularly desirable where autothermal reforming is intended because the operating temperature of such reformers can range from about 550° C. to about 900° C., depending on the feed conditions and the catalyst.

Pre-reformer 10 comprises two primary components, namely, a combustion section shown between lines 20 and 20', which houses combustion chamber 36 within outer wall 6, and a heat recovery section, shown between lines 20' and 20", which houses the heat recovery chamber 38 within outer wall 8.

As illustrated, the combustion chamber is elevated above the heat exchange chamber. It is envisioned that the combustion section and heat exchange section need not be aligned on the same vertical axis. However, for purposes of manufacture, cost and simplicity of design, it is preferable that the two sections have a vertical orientation about a common axis. Further, it is believed that the vertical orientation of the combustion chamber above the heat exchange chamber provides a more rapid and uniform heating of the heat exchange chamber.

The dimensions of the pre-reformer are believed to be critical to achieving rapid start-up of the pre-reformer, and thus, of the reformer as well. It is preferred that the housing formed by outer walls 6 and 8, will have a length and an internal diameter in a ratio from about 7:1 to about 3:1 and more preferably from about 6:1 to about 4:1. Outer wall 6 of the combustion section and outer wall 8 are preferably continuous with one another forming a cylindrical housing along the length of the combustion and heat exchange sections. These two sections need not have the same diameters, but again, such a configuration is preferred for integrating the pre-reformer with a reformer or other elements of a power generation system in a space critical environment. Specifically, it is preferred that the housing have a length of at least about 20 inches, preferably at least about 30 inches, and more preferably at least about 40 inches. The internal diameter of the housing is less than about 10 inches, preferably less than about 8 inches, more preferably less than about 6 inches and still more preferably less than about 5 inches.

Upstream of combustion chamber 36 is inlet 32 through which an oxygen-containing gas and a hydrocarbon fuel is directed into the combustion chamber. The oxygen can be in the form of air, enriched air, or substantially pure oxygen. The hydrocarbon fuel is preferably in the gas phase at ambient conditions, but may be liquid provided that it can be easily vaporized. As used herein, the term "hydrocarbon" includes organic compounds having C—H bonds which are capable of producing hydrogen from a partial oxidation or steam reforming reaction. The presence of atoms other than carbon and hydrogen in the molecular structure of the compound is not excluded. Thus, suitable fuels for use in the method and apparatus disclosed herein include (but are not limited to) not only such fuels as natural gas, methane, ethane, propane, butane, naphtha, gasoline diesel and mixtures thereof, as well as alcohols such as methanol, ethanol, propanol, the like and mixtures thereof. Preferably, the hydrocarbon combustion fuel is natural gas.

As noted above, fuel cell exhaust may also be directed into combustion chamber 36 for oxidation as it typically contains a number of constituents that must be disposed of and should not be vented to the atmosphere. In addition, a side-stream (not shown in FIG. 1) can be provided upstream from the fuel cell stack for directing off-spec reformate to the pre-reformer for combustion as well.

Optionally, but preferably, the pre-reformer will have means for pre-heating the combustion gases upstream from combustion chamber 36. As illustrated, electrical heating element 12 is provided upstream from the combustion chamber and is capable of reaching temperatures of at least about 300° C. Different heating means are known in the art and may be used to advantage in place of electrical heating element 12 either within the combustion chamber, in-line or within a separate module upstream from inlet 32. Optionally, but preferably, the pre-reformer will also have mixing means upstream from combustion chamber 36. As illustrated, static mixer 2 is provided in-line to mix gases entering through inlet 32. In the alternative, mixing means may be provided as a separate module upstream from the combustion section for this purpose.

Disposed within combustion chamber 36 is combustion catalyst 16. Combustion catalyst 16 should be an oxidation catalyst such as are well known to those with skill in the art. Examples of suitable oxidation catalyst include noble metals such as platinum, palladium, rhodium, and/or ruthenium on an alumina wash coat on a monolith, extrudate, pellet or other support. Non-noble metals such as nickel or cobalt have also been used. Other wash coats such as titania, zirconia, silica, and magnesia have also been cited in the literature. Many additional materials such as lanthanum, cerium, and potassium have been cited in the literature as "promoters" that improve the performance of the oxidation catalyst.

The oxidation reaction occurs very quickly to the complete the conversion of oxygen added and produces heat. It is intended that regardless of the composition of the combustion catalyst, the catalyst medium should provide a non-diffused flow path for the combustion gases and heat to pass through the combustion chamber. As used herein, "non-diffused flow path" refers to a catalyst medium that has a plurality of pathways across the catalyst medium such that the flow of gas across the medium is not substantially inhibited. Specifically, the catalyst medium should allow a gas flow therethrough in the range of at least about 5000 gas hourly space velocity (GSHV) up to about 20,000 GHSV. The temperature and pressure of the combustion gases passing through the catalyst media will be between about 400° C. and about 650° C. and the pressure should be approximately ambient. Preferably, the catalyst medium is a monolith support having a plurality of open channels that provide the heated combustion product gases open flow paths through the catalyst medium. It has been found that a monolith catalyst medium enables the combustion catalyst to reach a more uniform temperature across the combustion chamber more rapidly than a packed catalyst bed.

Opening 14 between the combustion chamber 36 and the heat exchange chamber 38 provides for fluid communication between the two chambers. As the combustion fuel and oxygen-containing gas are combusted over catalyst 16, the heated combustion product gases are driven down into heat exchange chamber 38.

Heat exchange chamber 38 is defined by outer wall 8. Disposed within heat exchange chamber 38 is at least one heat exchange element 18. As illustrated in FIG. 2, pre-reformer 10 has a plurality of heat exchange elements 18a and 18b within heat exchange chamber 38. Heat exchange element 18a has inlet 22 through which a stream of a reformer reactant is directed and outlet 28 through which the heated reformer reactant is directed out of the pre-reformer. The reformer reactant may be a hydrocarbon fuel as previously described, an oxygen-containing gas, water, or some combination thereof.

Heat exchange element 18b is shown with inlet 24 and outlet 26. Inlets 22 and 24 and outlets 26 and 28 are shown as being located in the lower portion of heat exchange chamber 38. It is envisioned that the location of the outlets 26 and 28 may be altered so that they are in proximity to the inlets of the associated reformer. Heat loss is a concern and it is desired that the integrated pre-reformer and reformer be configured so as to minimize the heat loss that may occur in the connections between them.

Preferably, two or more of the reformer reactants will be pre-heated in separate heat exchange elements. Depending on the nature of the reformer reactant(s) and the amount of heating required, the heat exchange elements will have different dimensions and configurations, and thus, different heat exchange surface areas appropriate for the various reformer reactants.

For example, the preheating of the gaseous fuel and oxygen-containing gases is preferably achieved within a section of coiled tubing having larger diameters and shorter lengths, so as to minimize any pressure loss on the gases passing through the exchanger. In contrast, the generation of superheated steam is preferably achieved in more narrow heat exchanger coils of longer length where pressure losses are of less a concern, but increased heat transfer is critical.

It is also desirable that the heat exchange elements account for a large percentage of the volume within the heat recovery chamber so as to provide maximum heat recovery. Preferably the heat exchange elements account for at least about 50%, more preferably at least about 60%, and still more preferably at least about 70% of the volume within heat recovery chamber 38. As illustrated in FIG. 2, heat exchange elements 18a and 18b comprise coiled tubing having different lengths and diameters. By way of example only, element 18a is used to pre-heat a hydrocarbon gas with or without an oxygen-containing gas, while element 18b, having the greater heat exchange surface area, is used to convert water to steam.

Furthermore, it should be noted that the heat exchange elements 18a and 18b are preferably configured so that the reformer reactants are initially directed up into heat exchange chamber 38 and nearly into combustion chamber 36. The heat exchange elements then turn and begin a downward spiral so that the reformer reactants descend slowly out of the heat exchange chamber. This downward spiral not only provides for more rapid and uniform heating of the reactants, but has also been found to minimize condensation within in the heat exchange elements that might otherwise occur during shut-down procedures. Condensation is a common problem in heat exchanging devices particularly during cool-down procedures and can lead to corrosion, clogging and other maintenance issues.

The heated combustion gases generated in the combustion section fill heat exchange chamber 38 and exchange heat with the reformer reactants across the surfaces of the heat exchange elements 18a and 18b. The reformer reactant(s) are heated as they pass through the coiled tubing. The heated reactants are then directed to outlets 26 and 28, respectively. Not shown in FIG. 2, are conduits or tubing that connect outlets 26 and 28 to inlets of a reformer (also not shown in FIG. 2). Again, the location of the outlets should be in close proximity to the inlets of the reformer so as to minimize heat loss in connections between the two devices. Also co-located on the lower most portion of heat exchange chamber 38 is combustion exhaust 30 for venting heated combustion product gases from pre-reformer 10.

Method for Rapid Start-Up of Fuel Processor

The present invention further provides a method for the rapid start-up of a fuel processor that comprises a pre-reformer and reformer. The method comprises, in a pre-reformer, combusting a fuel and an oxygen-containing gas with a combustion catalyst to generate heated combustion gases within a combustion section.

Optionally, the fuel and/or oxygen-containing gas can be pre-heated prior to their combustion. The pre-heating of these combustion reactants facilitates the combustion reaction. Pre-heating is preferably accomplished by an electrical heating element located immediately upstream from the combustion catalyst but can be accomplished by other heating means known in the art. During start-up, the heating element should be capable of quickly reaching temperatures greater than about 200° C., preferably greater than about 250° C., and more preferably greater than about 300° C., in order for the combustion of fuel and oxygen to begin. However, following start-up and during normal operation, the reaction between hydrogen-containing fuel and oxygen occurs at normal room temperature. At such times, the use of the heating element may not be necessary.

Optionally, but highly preferred, the combustion fuel and oxygen-containing gas can be mixed prior to their combustion. This mixing is preferably achieved with an in-line static mixer having baffles and/or fins for disrupting the flow of gases therethrough. Where other gases such as fuel cell exhaust gases are also to be combusted, these gases should be combined and mixed with the combustion fuel and oxygen-containing gas prior to entry into the combustion section. Those skilled in the art should recognize that other means for mixing the gaseous combustion reactants may be suitable.

The heated combustion product gases pass through the combustion catalyst and into a heat recovery section where heat is exchanged between the heated combustion gases and a fuel reformer reactant to give a heated reactant. In order to achieve rapid start-up of the fuel processor, the heated combustion gases should pass through the combustion catalyst and into the heat recovery section along a non-diffused flow path. Preferably, a monolithic combustion catalyst is used to provide a non-diffused flow path through the catalyst medium. In the alternative, other catalyst media may be used provided that the other catalyst media can provide at least about 5000 GHSV during start-up and is capable of providing up to 20,000 GHSV during operation.

The combustion section is elevated relative to the heat recovery section such that the passing of the heated combustion gases from the combustion section into the heat recovery section is a result of displacement. The displacement of heated combustion gases into the heat recovery section is believed to provide a more rapid and uniform heating of the heat recovery section.

Heat is exchanged between the reformer reactant and the heated combustion gases in heat exchanging elements disposed within the heat recovery section. Separate heat exchanging elements can be used for two or more reformer reactants and different sized and configured heat exchanging elements may be used for different reformer reactants depending on the nature and heating requirements for each. For instance, it is envisioned that streams of the hydrocarbon reformer fuel and oxygen-containing gas can be directed through the same heat exchanging element while water can be directed through a separate heat exchanging element having a greater amount of heat exchanging surface area for conversion to steam.

The combustion of the fuel and oxygen-containing gas generates heated combustion gases within the catalyst bed that are displaced down into a heat recovery section where the heat is exchanged to produce steam and to pre-heat reforming reactants. It has been found that an operational temperature is achieved when the heated combustion gases within the heat recovery section generated adequate steam and sufficiently pre-heated reformer reactants to promote an autothermal reforming reaction in the reformer. This operational temperature was observed when the temperature in the combustion chamber reached at least about 500° C., preferably at least about 550° C. and more preferably at least about 600° C. Unlike conventional pre-reformers, this operational temperature can be achieved in less than about 20 minutes, preferably less than about 15 minutes, and more preferably less than about 10 minutes. Once this operation temperature within the pre-reformer has been achieve, the steam and heated reformer reactant(s) are directed into the reformer where autothermal reforming may begin.

Reformer

Two different reactions are typically carried out in the reforming process. Formulas I and II are exemplary reaction formulas wherein methane is considered as the hydrocarbon:

$$CH_4 + \tfrac{1}{2}O_2 \Rightarrow 2H_2 + CO \tag{I}$$

$$CH_4 + H_2O \Rightarrow 3H_2 + CO \tag{II}$$

The partial oxidation reaction (formula I) occurs very quickly to the complete conversion of oxygen added and is exothermic (i.e., produces heat). A higher concentration of oxygen in the feed stream favors the partial oxidation reaction.

The steam reforming reaction (formula II), occurs slower and is endothermic (i.e., consumes heat). A higher concentration of water vapor favors steam reforming.

One of skill in the art should understand and appreciate that partial oxidation and steam reforming may be combined to convert the pre-heated reformer reactant from the pre-reformer into a synthesis gas containing hydrogen and carbon monoxide. In such instances, the ratios of oxygen to hydrocarbon and water to hydrocarbon become characterizing parameters. These ratios affect the operating temperature and hydrogen yield. The operating temperature of the reforming step can range from about 550° C. to about 900° C., depending on the feed conditions and the catalyst.

The reformer uses a catalyst bed that may include one or more catalysts in any form including pellets, spheres, extrudate, monoliths, and the like or wash coated onto the surface of fins or heat pipes. Partial oxidation catalysts should be well known to those with skill in the art and are often comprised of noble metals such as platinum, palladium, rhodium, and/or ruthenium on an alumina wash coat on a monolith, extrudate, pellet or other support. Non-noble metals such as nickel or cobalt have been used. Other wash coats such as titania, zirconia, silica, and magnesia have been cited in the literature. Many additional materials such as lanthanum, cerium, and potassium have been cited in the literature as "promoters" that improve the performance of the partial oxidation catalyst. Steam reforming catalysts should be known to those with skill in the art and can include nickel with amounts of cobalt or a noble metal such as platinum, palladium, rhodium, ruthenium, and/or iridium. The catalyst can be supported, for example, on magnesia, alumina, silica, zirconia, or magnesium aluminate, singly or in combination. Alternatively, the steam reforming catalyst can include nickel, preferably supported on magnesia, alumina, silica, zirconia, or magnesium aluminate, singly or in combination, promoted by an alkali metal such as potassium.

When the reforming process is primarily an autothermal reforming process, a cooling step for cooling the reformate stream to a temperature of from about 600° C. to about 200° C., preferably from about 500° C. to about 300° C., and more preferably from about 425° C. to about 375° C., to optimize the temperature of the reformate before clean-up processes. This cooling may be achieved with heat sinks, heat pipes or heat exchangers depending upon the design specifications and the need to recover/recycle the heat content of the gas stream. Alternatively, or in addition thereto, cooling may be accomplished by injecting additional feed components such as fuel, air or water. Water is preferred because of its ability to absorb a large amount of heat as it is vaporized to steam. The amounts of added components depend upon the degree of cooling desired and are readily determined by those with skill in the art. When the reforming process is intended to be primarily a steam reforming process, cooling of the synthesis gas is optional because of the endothermic nature of the steam reforming process.

The pre-reformer of the present invention will be integrated with a reformer or fuel processor as are known in the art for use in reforming or converting a hydrocarbon stream to a hydrogen-rich gas stream of fuel cell quality. Suitable reformers include but are not limited to those described in U.S. Patent Publication Nos.: U.S. 2002/0083646 A1 to Deshpande, et al., published Jul. 4, 2002; U.S. 2002/0090326 A1 to Deshpande, published Jul. 11, 2002; U.S. 2002/0090328 A1 to Deshpande, published Jul. 11, 2002; U.S. 2002/0090327 A1 to Deshpande, published Jul. 11, 2002; U.S. 2002/0088740 A1 to Krause, et al., published Jul. 11, 2002; U.S. 2002/0094310 A1, to Krause, et al., published Jul. 18, 2002; U.S. 2002/0155329 A1 to Stevens, published Oct. 24, 2002; U.S. 2003/00211741 A1 to Childress, et al., published Jan. 30, 2003; and U.S. 2003/0021742 to Krause, et al., published Jan. 30, 2003, the disclosures of which are incorporated herein by reference. These publications disclose a number of differently configured reformers that may be used to advantage with the pre-reformers of the present invention. However, it is preferred that the reformer integrated with the pre-reformer of the present invention be a bottom-fed type reactor.

Post Reformer Clean-Up and Shift Reactions

One of the main impurities of the hydrocarbon stream is sulfur, which is converted by the reforming process to hydrogen sulfide. The reformer or a module downstream from the reformer can preferably include zinc oxide and/or other material capable of absorbing and converting hydrogen sulfide, and may include a support (e.g., monolith, extrudate, pellet etc.). Desulphurization is accomplished by converting the hydrogen sulfide to water in accordance with the following reaction formula III:

$$H_2S + ZnO \Rightarrow H_2O + ZnS \quad (III)$$

Other impurities such as chlorides can also be removed. The reaction is preferably carried out at a temperature of from about 300° C. to about 500° C., and more preferably from about 375° C. to about 425° C. Zinc oxide is an effective hydrogen sulfide absorbent over a wide range of temperatures from about 25° C. to about 700° C. and affords great flexibility for optimizing the sequence of processing steps by appropriate selection of operating temperature.

The reformate stream may then be sent to an optional mixing step in which water is added to the gas stream. The addition of water lowers the temperature of the reactant stream as it vaporizes and supplies more water for the water gas shift reaction. The water vapor and other reformate stream components can be mixed by being passed through a processing core of inert materials such as ceramic beads or other similar materials that effectively mix and/or assist in the vaporization of the water.

A typical water gas shift reaction converts carbon monoxide to carbon dioxide in accordance with formula IV:

$$H_2O + CO \Rightarrow H_2 + CO_2 \quad (IV)$$

In this is process step, carbon monoxide, a poison to fuel cells, is substantially removed from the gas stream and is converted into carbon dioxide, which is generally considered an inert gas in fuel cells. The concentration of carbon monoxide should preferably be lowered to a level that can be tolerated by fuel cells, typically below about 50 ppm. Generally, the water gas shift reaction can take place at temperatures of from 150° C. to 600° C. depending on the catalyst used. Under such conditions, most of the carbon monoxide in the gas stream is oxidized to carbon dioxide.

Low temperature shift catalysts operate at a range of from about 150° C. to about 300° C. and include for example, copper oxide, or copper supported on other transition metal oxides such as zirconia, zinc supported on transition metal oxides or refractory supports such as silica, alumina, zirconia, etc., or a noble metal such as platinum, rhenium, palladium, rhodium or gold on a suitable support such as silica, alumina, zirconia, and the like. High temperature shift catalysts are preferably operated at temperatures ranging from about 300° to about 600° C. and can include transition metal oxides such as ferric oxide or chromic oxide, and optionally including a promoter such as copper or iron silicide. Also included, as high temperature shift catalysts are supported noble metals such as supported platinum, palladium and/or other platinum group members. The shift catalyst can include a packed bed of high temperature or low temperature shift catalyst such as described above, or a combination of both high temperature and low temperature shift catalysts. Optionally, an element such as a heat pipe may be disposed in the processing core of the shift reactor to control the reaction temperature within the packed bed of catalyst as lower temperatures are favorable to the conversion of carbon monoxide to carbon dioxide.

In addition, selective oxidation can optionally be performed on the hydrogen-rich reformate to convert remaining carbon monoxide to carbon dioxide. Such reactions include: the desired oxidation of carbon monoxide (formula V) and the undesired oxidation of hydrogen (formula VI) as follows:

$$CO + \tfrac{1}{2}O_2 \Rightarrow CO_2 \quad (V)$$

$$H_2 + \tfrac{1}{2}O_2 \Rightarrow H_2O \quad (VI)$$

The processing is carried out in the presence of one or more catalysts for the oxidation of carbon monoxide and may be in any suitable form, such as pellets, spheres, monolith, etc. Oxidation catalysts for carbon monoxide are known and typically include noble metals (e.g., platinum, palladium) and/or transition metals (e.g., iron, chromium, manganese), and/or compounds of noble or transition metals, particularly oxides. A preferred oxidation catalyst is platinum on an alumina wash coat. The wash coat may be applied to a monolith, extrudate, pellet or other support. Additional materials such as cerium or lanthanum may be added to improve performance. Many other formulations have been cited in the literature with some practitioners claiming superior performance from rhodium on alumina catalysts. Ruthenium, palladium, gold, and other materials have been cited in the literature as being active for this use as well.

The preferential oxidation of carbon monoxide is favored by low temperatures. Because both reactions produce heat, a heat pipe or other means can be disposed within the reactor to remove heat generated in the process. The operating temperature of process is preferably kept in the range of from about 90° C. to about 150° C. Again, such an oxidation process can be utilized to reduce the carbon monoxide level to less than 50 ppm, a level that is suitable for use in fuel cells.

The hydrogen-rich reformate exiting the fuel processor is a hydrogen rich gas containing carbon dioxide and other constituents such as water, inert components (e.g., nitrogen, argon), residual hydrocarbon, etc. This reformate can be used as the feed for a fuel cell or for other applications where a hydrogen-rich feed stream is desired. Optionally, product gas may be sent on to further processing, for example, to remove the carbon dioxide, water or other components.

Fuel Cell Stack and Integration With the Pre-Reformer

A power generation system comprising the pre-reformer and reformer of the present invention, and fuel cell stack is shown in FIG. 1 with the fuel cell stack generally indicated at D. Fuel cell stack D includes one or more fuel cells, typically in the form of a fuel cell stack that includes a plurality of fuel cells operatively coupled together. Although referred to herein as a fuel cell stack, it is within the scope of the present invention that fuel cell stack D may include only a single fuel cell, a plurality of separately operational fuel cells, or a plurality of separately operational or interconnected fuel cell stacks. Examples of suitable fuel cells include proton exchange membrane (PEM) fuel cells and alkaline fuel cells.

The hydrogen-rich reformate produced by reformer B is cleaned up and shifted to increase the hydrogen concentration and then delivered to fuel cell stack D. Fuel cell stack D uses the reformate to produce electrical power, water, spent reformate and spent air. The spent reformate stream exhausted from the fuel cell stack generally contains residual hydrogen and carbon monoxide. When the fuel cell is integrated with a pre-reformer of the present invention, the spent reformate is directed to the combustion section of the pre-reformer. Although referred to herein as a pre-reformer, the combustion section is sometimes referred to as an anode tail gas oxidizer (ATO). In some embodiments, the spent air exhausted from the fuel cell stack (not shown) can be mixed with the spent reformate to provide the oxygen-containing gas required by the combustion section of the pre-reformer.

Integrated Fuel Reforming Apparatus

In another embodiment of the present invention, an integrated fuel processing apparatus for rapid start-up is provided. The integrated apparatus includes a pre-reformer configured to provide a heated fuel reforming reactant to a fuel reformer. The pre-reformer includes a combustion section having an outer wall enclosing a combustion chamber and a catalyst disposed within the combustion chamber. The catalyst provides a non-diffused flow path through the catalyst for the passage of combustion gases and heat into a heat recovery section that is in fluid communication with the combustion section. The heat recovery section has an outer wall defining a heat recovery chamber and at least one heat exchanging element disposed within said heat recovery chamber. The heat exchanging element has an inlet for receiving a reformer reactant and an outlet for directing a heated reactant out of the heat recovery section. The inlet and the outlet of the heat exchanging element are preferably located on the lower portion of the outer wall of the heat recovery section. The combustion section is elevated relative to the heat recovery section such that the passage of heated combustion gases into the heat recovery section is the result of displacement. The outer wall of the combustion section and the outer wall of the heat recovery section form a housing for the pre-reformer. The housing preferably has a length and a diameter that are in a ratio between about 7:1 to about 4:1. A fuel reformer is connected to the outlet of the heat exchanging element for receiving a heated reactant from the pre-reformer. Preferably, the fuel reformer is a bottom-fed type steam reformer. Furthermore, it is envisioned that the pre-reformer can be configured to receive an exhaust gas from a fuel cell and to direct the exhaust gas into the combustion section with the combustion fuel and oxygen-containing gases.

In yet an additional embodiment of the present invention, an integrated fuel processing apparatus for rapid start-up is provided. The integrated apparatus comprising a pre-reformer configured to provide a heated reforming reactant to a fuel reformer. The pre-reformer includes a housing, a combustion chamber having a combustion catalyst disposed therein for generating heated combustion gases, and a heat recovery section having at least one heat exchanging element disposed therein. The heat exchanging element has an inlet for receiving a reactant and an outlet for directing a heated reactant out of the heat recovery section. The housing has a length and diameter in a ratio between about 7:1 to about 4:1. A fuel reformer is connected to the outlet of the heat exchanging element for receiving a heated reactant from the pre-reformer. Furthermore, it is envisioned that the pre-reformer can be configured to receive an exhaust gas from a fuel cell and to direct the exhaust gas into the combustion section with the combustion fuel and oxygen-containing gases.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. Apparatus for rapid heating of reactants for use in a fuel reformer, the apparatus comprising:
a combustion section having an outer wall enclosing a combustion chamber and a catalyst disposed within the combustion chamber, said catalyst providing a non-diffused flow path through the combustion chamber for the passage of combustion gases and heat;

optionally, a mixer upstream of said combustion chamber for mixing two or more combustion reactants;

optionally, heating means upstream of said combustion chamber for preheating the combustion reactants before contacting the catalyst; and a heat recovery section in fluid communication with the combustion chamber, the heat recovery section having an outer wall defining a heat recovery chamber, at least one heat exchanging element disposed within said heat recovery chamber, said heat exchanging element having an inlet for receiving a reformer reactant and an outlet for directing a heated reformer reactant out of the heat recovery section to a fuel reformer;

wherein the combustion section is elevated relative to the heat recovery section.

2. The apparatus of claim 1, wherein the heating means is a source of heat external to the apparatus.

3. The apparatus of claim 1, wherein the heating means is a heat radiating element disposed within the combustion chamber.

4. The apparatus of claim 1, wherein the catalyst is a monolithic catalyst.

5. The apparatus of claim 1, wherein the heat exchanging element is coiled tubing.

6. The apparatus of claim 1, wherein the heat recovery chamber has at least two heat exchanging elements disposed therein.

7. The apparatus of claim 6, wherein the at least two heat exchanging elements comprise first and second heat exchanging elements, the first heat exchanging element having a surface area for exchanging heat that is less than the surface area of the second heat exchanging element.

8. The apparatus of claim 7, wherein the second heat exchanging element converts water to steam.

9. The apparatus of claim 1 where in the outer wall of the combustion section and the outer wall of the heat recovery section form a housing for the apparatus.

10. The apparatus of claim 9, wherein the inlet and the outlet of a heat exchanging element are located on the lower portion of the outer wall of the heat recovery section.

11. The apparatus of claim 9, wherein the housing is cylindrical.

12. The apparatus of claim 11, wherein the cylinder has an internal diameter of less than about 10 inches.

13. The apparatus of claim 12, wherein the cylinder has an internal diameter of less than about 8 inches.

14. The apparatus of claim 13, wherein the cylinder has an internal diameter of less than about 6 inches.

15. The apparatus of claim 9, wherein the housing has a length and a diameter and a ratio between said length and diameter of between about 7:1 to about 4:1.

16. An integrated fuel processing apparatus for rapid start-up, the apparatus comprising:

a pre-reformer configured to provide a heated fuel reforming reactant to a fuel reformer, said pre-reformer comprising, a combustion section having an outer wall enclosing a combustion chamber and a catalyst disposed within the combustion chamber, said catalyst providing a non-diffused flow path through the catalyst for the passage of combustion gases and heat;

a heat recovery section in fluid communication with the combustion section, the heat recovery section having an outer wall defining a heat recovery chamber, at least one heat exchanging element disposed within said heat recovery chamber, said heat exchanging element having an inlet for receiving a reactant and an outlet for directing a heated reactant out of the heat recovery section;

wherein the combustion section is elevated relative to the heat recovery section; and a fuel reformer connected to the outlet of the heat exchanging element for receiving a heated reactant from the pre-reformer.

17. The integrated apparatus of claim 16, wherein the fuel reformer is a bottom-fed steam reformer.

18. The integrated apparatus of claim 16, wherein the pre-reformer is configured to receive an exhaust gas from a fuel cell and to direct the exhaust gas into the combustion section.

19. The integrated apparatus of claim 16, wherein the outer wall of the combustion section and the outer wall of the heat recovery section form a housing for the pre-reformer.

20. The integrated apparatus of claim 19, wherein the housing has a length and a diameter and a ratio of said length and diameter between about 7:1 to about 4:1.

21. The integrated apparatus of claim 16, wherein the inlet and the outlet of a heat exchanging element are located on the lower portion of the outer wall of the heat recovery section.

22. An integrated fuel processing apparatus for rapid start-up, the apparatus comprising:

a pre-reformer configured to provide a heated reforming reactant to a fuel reformer, said pre-reformer comprising a housing, a combustion chamber having a combustion catalyst disposed therein for generating heated combustion gases, and a heat recovery section having at least one heat exchanging element disposed therein, said heat exchanging element having an inlet for receiving a reactant and an outlet for directing a heated reactant out of the heat recovery section; the housing having a length and diameter, in a ratio between about 7:1 to about 4:1; and a fuel reformer connected to the outlet of the heat exchanging element for receiving a heated reactant from the pre-reformer.

23. The apparatus of claim 22, wherein the inlet of the heat exchanging element is in fluid communication with a source of water for receiving and converting water to steam.

24. The apparatus of claim 16, wherein the inlet of the heat exchanging element is in fluid communication with a source of water for receiving and converting water to steam.

25. The apparatus of claim 1, wherein inlet of the heat exchanging element is in fluid communication with a source of water for receiving and converting water to steam.

* * * * *